US012640847B2

(12) United States Patent
Barton et al.

(10) Patent No.: US 12,640,847 B2
(45) Date of Patent: May 26, 2026

(54) TRIGGER TO ENABLE DATA TRAFFIC REPLICATION IN A WIRELESS NETWORK

(71) Applicant: Cisco Technology, Inc., San Jose, CA (US)

(72) Inventors: Robert Barton, Richmond (CA); Jerome Henry, Pittsboro, NC (US); Thomas Szigeti, Vancouver (CA); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 630 days.

(21) Appl. No.: 17/813,624

(22) Filed: Jul. 20, 2022

(65) Prior Publication Data
US 2024/0031062 A1     Jan. 25, 2024

(51) Int. Cl.
*H04L 1/08*      (2006.01)
*H04L 45/74*     (2022.01)
*H04W 28/04*     (2009.01)

(52) U.S. Cl.
CPC ................ *H04L 1/08* (2013.01); *H04L 45/74* (2013.01); *H04W 28/04* (2013.01)

(58) Field of Classification Search
CPC ........................................................ H04L 1/08
See application file for complete search history.

(56) References Cited

U.S. PATENT DOCUMENTS

| | | | | |
|---|---|---|---|---|
| 7,664,019 B2 * | 2/2010 | Boyd | .................. | H04L 41/5022 |
| | | | | 398/58 |
| 8,111,649 B1 * | 2/2012 | Agarwall | ................ | H04L 12/00 |
| | | | | 370/328 |
| 8,134,943 B2 * | 3/2012 | Song | ........................ | H04W 4/12 |
| | | | | 455/412.2 |
| 9,025,458 B2 * | 5/2015 | Chan | ........................ | H04L 47/32 |
| | | | | 370/235 |
| 9,210,735 B2 * | 12/2015 | Sarikaya | ............. | H04L 61/2553 |
| 10,135,741 B2 * | 11/2018 | Welin | .................... | H04W 56/00 |
| 10,231,117 B2 * | 3/2019 | Sahu | .................... | H04L 65/1016 |
| 10,728,149 B1 * | 7/2020 | Ramanujan | ........... | H04L 45/745 |
| 10,904,135 B2 * | 1/2021 | Hegde | ................. | H04L 43/0805 |
| 11,032,188 B2 * | 6/2021 | Modi | ....................... | H04L 45/74 |
| 11,064,395 B1 * | 7/2021 | Marupaduga | ........... | H04W 8/18 |
| 11,343,715 B1 * | 5/2022 | Barbulescu | ......... | H04L 67/1095 |
| 2008/0014956 A1 * | 1/2008 | Balasubramanian | ... | H04L 43/16 |
| | | | | 455/452.1 |
| 2010/0195554 A1 * | 8/2010 | Song | .................. | H04L 12/1881 |
| | | | | 370/312 |

(Continued)

FOREIGN PATENT DOCUMENTS

JP          2012-044579 A      3/2012

*Primary Examiner* — Guang W Li

(74) *Attorney, Agent, or Firm* — Merchant & Gould P.C.

(57) ABSTRACT

A trigger to enable data traffic replication in a wireless network may be provided. A data packet comprising a Differentiated Service Code Point (DSCP) field in a header may be received. A determination may be made that the data packet comprises a candidate traffic for bi-casting. In response to determining that the data packet comprises the candidate traffic for bi-casting, a flag may be set in the DSCP field in the header of the data packet. The flag triggers bi-casting of the data packet. The data packet may be sent to a destination device.

20 Claims, 4 Drawing Sheets

(56)       References Cited

U.S. PATENT DOCUMENTS

| 2010/0260089 | A1* | 10/2010 | Lin ....................... H04W 24/08 |
| | | | 370/312 |
| 2012/0026903 | A1* | 2/2012 | Song ................... H04W 76/27 |
| | | | 370/252 |
| 2014/0003322 | A1 | 1/2014 | Grinshpun et al. |
| 2015/0256454 | A1* | 9/2015 | Schliwa-Bertling ......................... |
| | | | H04L 47/2408 |
| | | | 370/392 |
| 2017/0155580 | A1* | 6/2017 | Ramanujan ............. H04L 45/74 |
| 2018/0324641 | A1* | 11/2018 | Tsai .................... H04W 28/065 |
| 2018/0343662 | A1* | 11/2018 | Sang ................... H04W 72/23 |
| 2019/0089627 | A1* | 3/2019 | Mirsky .................. H04L 45/50 |
| 2019/0124572 | A1* | 4/2019 | Park ..................... H04W 40/24 |
| 2019/0222966 | A1* | 7/2019 | Horn ..................... H04W 28/12 |
| 2020/0328972 | A1 | 10/2020 | Ramanujan et al. |
| 2020/0396643 | A1* | 12/2020 | Kwok ............... H04W 28/0268 |
| 2021/0105866 | A1* | 4/2021 | Kavuri ................. H04W 76/27 |
| 2021/0120552 | A1 | 4/2021 | Fang et al. |
| 2022/0303210 | A1* | 9/2022 | Wheelock ............ H04L 45/566 |
| 2023/0198892 | A1* | 6/2023 | Liu ...................... H04L 45/741 |
| | | | 370/390 |
| 2023/0291682 | A1* | 9/2023 | Zhu ........................ H04L 45/50 |

* cited by examiner

TRIGGER TO ENABLE DATA TRAFFIC REPLICATION IN A WIRELESS NETWORK

TECHNICAL FIELD

The present disclosure relates generally to replication of data traffic in wireless networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
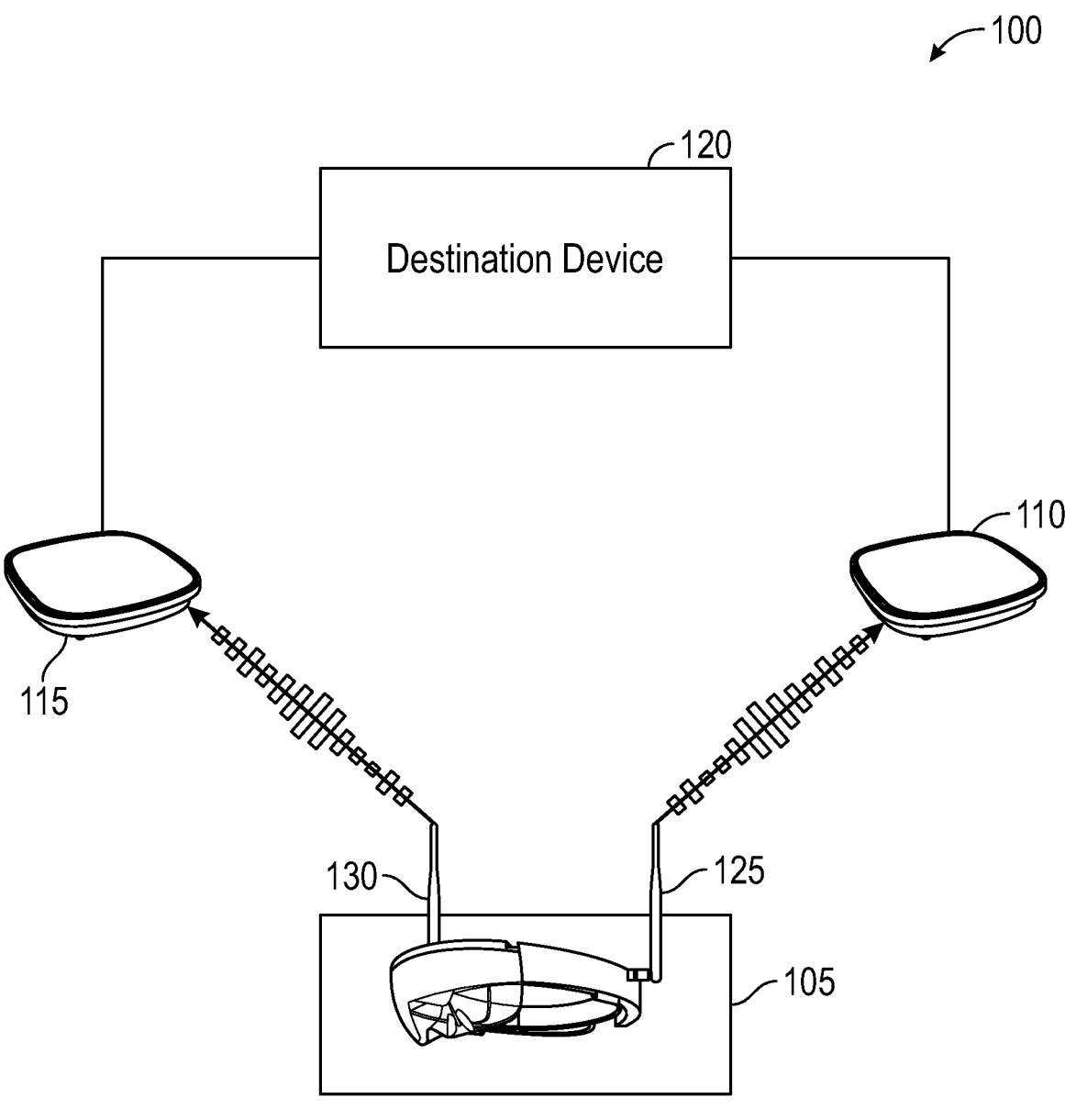
FIG. 1 is a block diagram of an operating environment for providing a trigger for bi-casting a data traffic in a wireless medium.

A trigger to enable data traffic replication in a wireless network may be provided. A data packet comprising a Differentiated Service Code Point (DSCP) field in a header may be received. A determination may be made that the data packet comprises a candidate traffic for bi-casting. In response to determining that the data packet comprises the candidate traffic for bi-casting, a flag may be set in the DSCP field in the header of the data packet. The flag triggers bi-casting of the data packet. The data packet may be sent to a destination device.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

High performance applications, such as, Augmented Video Games (AVG), Augmented Reality/Virtual Reality (AR/VR) applications, and real time remote control applications, may be pushing the performance limits across wireless networks. Wi-Fi7 may have capabilities to provide a better network performance and resilience for such applications. Wi-Fi7, for example, may provide a capability of transmitting a data traffic on two different radios simultaneously, also referred to as bi-casting. Bi-casting a data traffic across the wireless network may ensure that data packets are not lost. By replicating the data traffic and sending it on a separate link or a channel from the data traffic, if one of the links were to experience interference or path loss, data packets from the other link may still be likely to arrive without being affected in the same negative way. However, replicating and bi-casting each data traffic may waste resources and bandwidth.

Accordingly, embodiments of the disclosure may provide processes for selective bi-casting of data packets, for example, a latency sensitive traffic from an application on a user device. The application on the user device may set a flag in a Differentiated Service Code Point (DSCP) field in a header of each data packet of a candidate traffic selected for bi-casting. The flag in the DSCP field may trigger a network interface in the user device to replicate and simultaneously bi-cast data packets from the candidate traffic on two different and independent Wireless Communication Links (WCLs).

FIG. 1 shows an operating environment 100. As shown in FIG. 1, operating environment 100 may comprise a user device 105, a first AP 110, a second AP 115, and a destination device 120. User device 105 may be a Multi-Link Device (MLD) comprising multiple radios communication systems (i.e., radios), for example, a first radio communication system 125 and a second radio communication system 130. Each of first radio communication system 125 and second radio communication system 130 may enable user device 105 to communicate on an independent or separate WCL. Thus, user device 105 may communicate on two WCLs simultaneously.

First AP 110 and second AP 115 may be part of a Multi-Link Orchestration (MLO) cluster and may provide wireless access to user device 105 (e.g., over a Wireless Local Area Network (WLAN)). User device 105 may comprise, but is not limited to, an AR/VR device, an AP, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network. First AP 110 and second AP 115 may be compatible with specification standards such as, but not limited to, the Institute of Electrical and Electronics Engineers (IEEE) 802.11 specification standard for example.

The elements described above of operating environment 100 (e.g., user device 105, first AP 110, second AP 115, and destination device 120) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
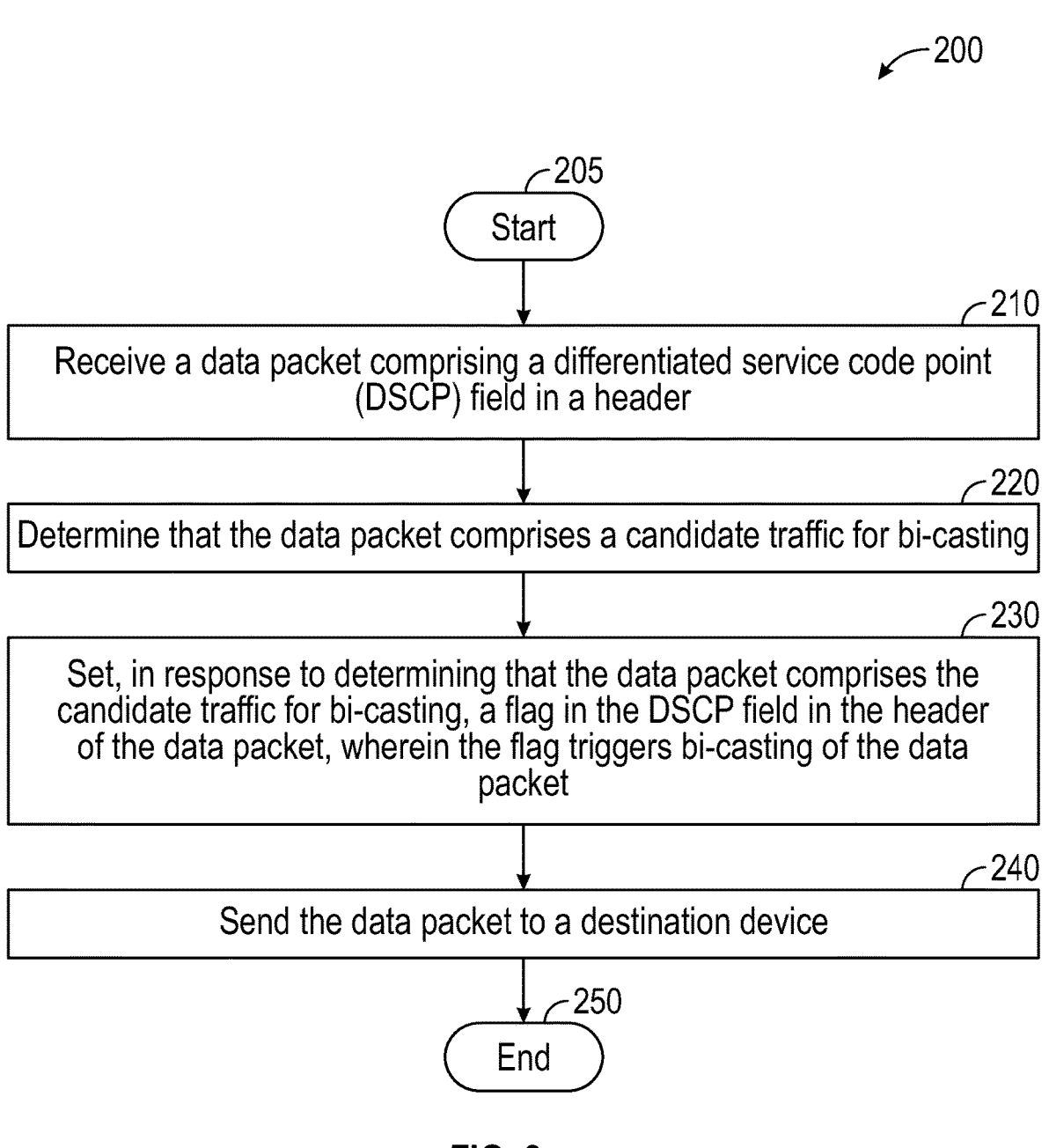
FIG. 2 is a flow chart of a method for providing a trigger for bi-casting a data traffic in a wireless medium.

FIG. 2 is a flow chart setting forth the general stages involved in a method 200 consistent with embodiments of the disclosure for providing a trigger for bi-casting a data traffic in a wireless medium. Method 200 may be implemented using user device 105 as described in more detail above with respect to FIG. 1. Ways to implement the stages of method 200 will be described in greater detail below.

Method 200 may begin at starting block 205 and proceed to stage 210 where user device 105 may receive a data packet comprising a DSCP field in a header. For example, an application (e.g., an AR/VR application) on user device 105 may generate data packets that may correspond to a different type of traffic or flow. The application may generate the data packets that may correspond to audio data traffic, video data traffic, control signals data traffic, software update data traffic, network telemetry data traffic, etc. Some of these data flows may be latency sensitive or time critical. Each data packet of a data traffic may contain a header that may include routing information, for example, a destination address corresponding to destination device 120. In addition, the header of the data packet may include a DSCP field. The DSCP field may be used to express a Quality of Service (QoS) for the data packet. The DSCP field may thus inform a network interface how the data packet may be queued and transmitted. A format of the DSCP field may be controlled by a Group Policy Object (GPO), or an MDM. Values in the DSCP field may be set by the application on user device 105 for each data packet.

Once user device 105 receives the data packet comprising the DSCP field in the header at stage 210, method 200 may process to stage 220 where user device 105 may determine that the data packet comprises a candidate traffic for bi-casting. The application on user device 105, for example, may determine that the data packet is latency sensitive or time critical, therefore may be a candidate traffic for bi-casting. The application on user device 105, in another example, may determine that the data packet contains an I-frame of video data or audio data, therefore, may be a candidate traffic for bi-casting. The application on user device 105, in yet another example, may determine that the data packet contains critical control data, therefore may be a candidate traffic for bi-casting. In some embodiments, an administrator may define a policy for classifying or determining a data packet as a candidate traffic for bi-casting.

From stage 220 where user device 105 determines that the data packet comprises the candidate traffic for bi-casting, method 200 may process to stage 230 where user device 105 may set a flag in the DSCP field in the header of the data packet. The flag may trigger bi-casting of the data packet. A set of DSCP Pool 2 markings may be used to set the flag. These markings may be reserved for experimental or local use and may not interfere with QoS markings. Differentiated Service (DiffServ) QoS Per Hop Behavior (PHB) may be taken from DSCP Pool 1 markings that may have a format: XXXXX0. A Least Significant Bit (LSB) of the DSCP field may generally be set to a first value, for example, a bit value 0. In accordance with example embodiments, the LSB of the DSCP may be used to mark or set a flag to trigger bi-casting of the data packet. Specifically, the LSB of the DSCP field may be changed from the first value (i.e. bit value 0) to a second value (i.e., bit value 1) bit value 1 (e.g. XXXXX1) to trigger bi-cast of the packet. Marking of the LSB of the DSCP field may be supported by various applications, operating systems, and network devices.

After user device 105 sets the flag in the DSCP field in the header of the data packet in stage 230, method 200 may proceed to stage 240 where user device 105 may send the data packet towards destination device 120. For example, after being marked with the flag that triggers bi-casting, the data packet may be received at a network interface of user device 105. The network interface of user device 105 may determine a destination address and markings in the DSCP field from the header of the data packet. The network interface may also determine that the flag that triggers bi-casting is set in the DSCP field in the header of the data packet. In response to detecting the flag, the network interface of user device 105 may trigger bi-casting of the data packet.

The network interface, for example, may create a replica of the data packet. In addition, user device 105 may establish a first WCL with first AP 110 using first radio 125 and a second WCL with second AP 115 using second radio 130. User device 105 then may simultaneously send the data packet over the first WCL to first AP 110 and the replica data packet over the second WCL to second AP 115. First AP 110 may forward the data packet to destination device 120 through a first path. Second AP 115 may forward the replica data packet to destination device 120 through a second path. The second path may be separate and different from the first path. Each of first AP 110 and second AP 115 may remove the flag that triggers bi-casting from the data packet and the replicated data packet respectively before forwarding it to destination device 120. First AP 110, for example, may receive the data packet from user device 105, remove the flag that triggers bi-casting from the DSCP field in the header of the data packet, and then forward the data packet to destination device 120 through the first path. Similarly, second AP 115 may receive the replicated data packet from user device 105, remove the flag that triggers bi-casting from the DSCP field in the header of the replicated data packet, and then forward the replicated data packet to destination device 120 through the first path.

Destination device 120 may receive both the data packet and the replica data packet. Destination device 120 may then discard one of the data packet and the replica data packet. Once user device 105 sends the data packet to destination device 120 in stage 240, method 200 may then end at stage 250.

Figure 3:
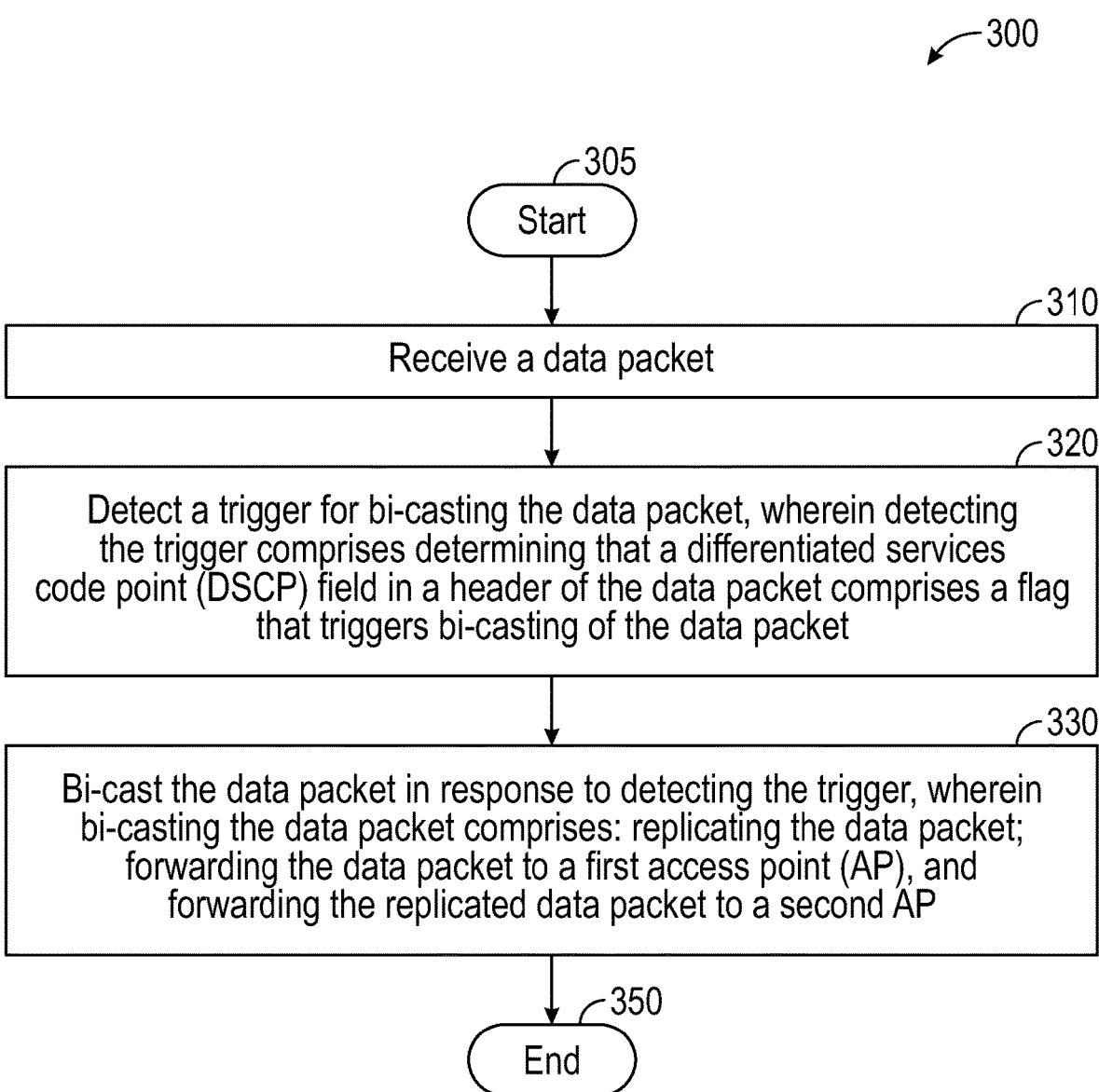
FIG. 3 is a flow chart of a method for bi-casting a data traffic in a wireless medium.

FIG. 3 is a flow chart setting forth the general stages involved in a method 300 consistent with an embodiment of the disclosure for bi-casting a data traffic in a wireless medium. Method 300 may be implemented using user device 105 as described in more detail above with respect to FIG. 1. Ways to implement the stages of method 300 will be described in greater detail below.

Method 300 may begin at starting block 305 and proceed to stage 310 where user device 105 may receive a data packet. For example, a network interface for user device 105 may receive a data packet generated by an application (e.g. an AR/VR application) running on user device 105.

From stage 310 where user device 105 receives the data packet, method 300 may process to stage 320 where user device 105 may detect a trigger for bi-casting the data packet. Detecting the trigger may comprise determining that a DSCP field in a header of the data packet comprises a flag that triggers bi-casting of the data packet. For example, the network interface of user device 105 may determine that the LSB of the DSCP field in the header of the data packet comprises a bit value of 1. The application that generated the data packet may set the LSB of the DSCP field to a bit value of 1 to trigger bi-casting of the data packet by the network interface.

Once user device 105 detects the trigger for bi-casting the data packet at stage 320, method 300 may proceed to stage 330 where user device 105 may bi-cast the data packet in response to detecting the trigger. Bi-casting the data packet may comprise replicating the data packet, forwarding the data packet to first AP 110, and forwarding the replicated data packet to second AP 115. For example, user device 105 may simultaneously forward the data packet to first AP 110 through first radio 125 on a first WCL and to second AP 115 through second radio 130 on a separate second WCL. Once user device 105 bi-casts the data packet in stage 330, method 300 may then end at stage 340.

In a return path to user device 105, an endpoint directly connected to a wireless medium may replicate steps discussed above with respect to FIG. 2 and FIG. 3. To keep replication orderly and to ensure diverse radio paths are used on both the upstream and downstream links, an endpoint that is not directly connected to a wireless interface may, upon detecting a bi-cast trigger for an in-flow traffic, duplicate and re-mark an out-flow traffic with another bi-cast trigger to indicate the first WCL or the second WCL to user device 105. A destination for each WCL may be associated with a matching Media Access Control (MAC) address of user device 105 for each WCL of the MLO connection. When the destination is beyond a local segment, the flag that triggers bi-casting may be used by a far end WCL/MLO APs to identify that these are replicated packets and to direct them downstream to a corresponding radio or AP in the MLO cluster. Thus, for both upstream and downstream flows, the replicated frames may use different radios to reach an endpoint.

In another embodiment, user device 105 may choose not to bi-cast a traffic if there is a low packet loss or jitter for example. In this embodiment, user device 105 may start by sending a data flow over a single WCL. However, as user device 105 detects degradation of the WCL conditions (e.g. increase of the retry rate, loss of linearity in buffer exhaustion, etc.), it may activate bi-casting for the candidate traffic by setting the flag in the DSCP field that triggers bi-casting.

In another embodiment, bi-casting may be implemented anywhere along a network path where it may be viewed as beneficial. In another words, bi-casting of the candidate traffic may not be limited to an access link between user device 105 and first AP 110 and second AP 115. For example, if the data traffic had to traverse a Software Defined Wide Area Network (SD-WAN) link, then at that juncture network devices may similarly be configured to classify the candidate traffic with a bi-casting trigger (e.g., the LSB of the DSCP field may be set to a bit value 1). This may enable bi-casting of the data packets of the candidate traffic over Virtual Private Network (VPN) tunnels or Direct Internet Access (DIA) links.

Figure 4:
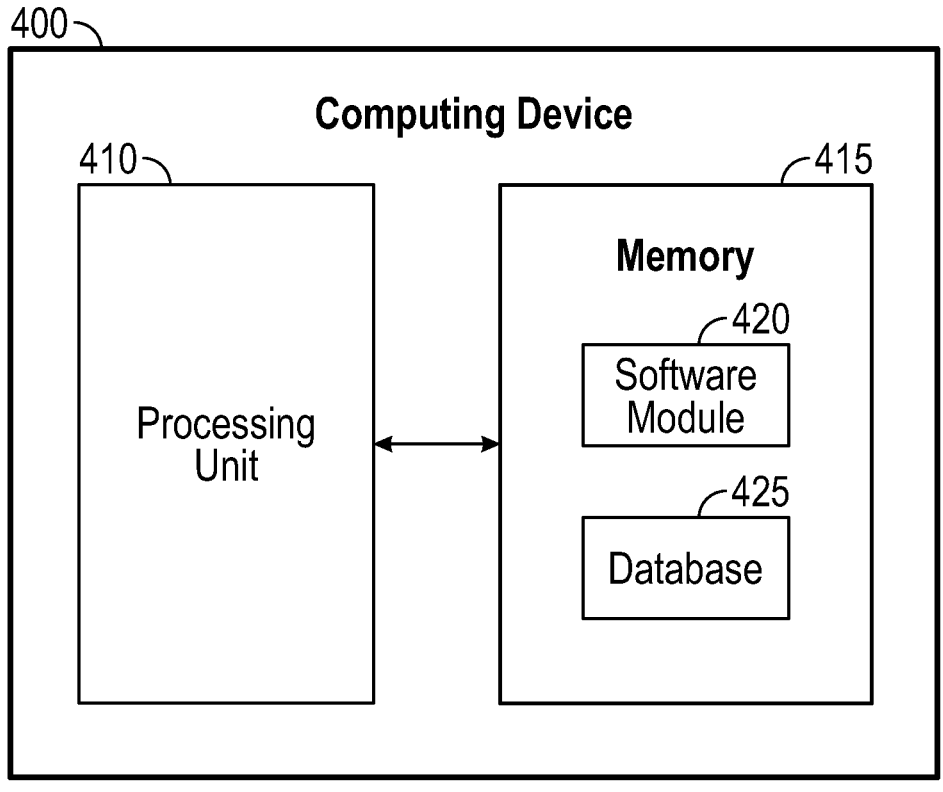
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing a trigger to enable data traffic replication in a wireless network as described above with respect to FIG. 2 and FIG. 3. Computing device 400, for example, may provide an operating environment for user device 105, first AP 110, second AP 115, and destination device 120. User device 105, first AP 110, second AP 115, and destination device 120 may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure

8

The invention claimed is:

1. A method comprising:

receiving a data packet comprising a Differentiated Service Code Point (DSCP) field in a header;

determining that the data packet comprises a candidate traffic for bi-casting;

setting, in response to determining that the data packet comprises the candidate traffic for bi-casting, a flag in the DSCP field in the header of the data packet, wherein the flag triggers replication of the data packet and simultaneous bi-casting of the data packet and replicated data packet on two different and independent wireless communication links; and sending the data packet to a destination device, wherein sending the data packet to the destination device comprises:

replicating, by a network interface of a user device, the data packet, sending the data packet to a first Access Point (AP) over a first Wireless Channel Link (WCL) through a first radio of the user device, wherein the first radio establishes the first WCL with the first AP, and simultaneously sending the replicated data packet to a second AP over a second WCL through a second radio of the user device, wherein the second radio establishes the second WCL with the second AP.

2. The method of claim 1, wherein setting the flag comprises changing a Least Significant Bit (LSB) in the DSCP field from a first value to a second value.

3. The method of claim 2, wherein changing the LSB in the DSCP field in the header of the data packet from the first value to the second value comprises changing the LSB in the DSCP field from a bit value 0 to a bit value 1.

4. The method of claim 1, further comprising:

receiving, by the first AP, the data packet;

removing, by the first AP, the flag from the DSCP field of the data packet; and forwarding, by the first AP after removing the flag from the DSCP field of the data packet, the data packet towards the destination device.

5. The method of claim 1, further comprising:

receiving, by the second AP, the replicated data packet by the second AP;

removing, by the second AP, the flag from the DSCP field of the replicated data packet; and forwarding, by the second AP after removing the flag from the DSCP field of the replicated data packet, the replicated data packet towards the destination device.

6. The method of claim 1, further comprising:

receiving the data packet and replicated data packet by the destination device; and discarding, by the destination device, one of the data packet and the replicated data packet.

7. The method of claim 1, wherein the first AP and the second AP form a Multi-Link Orchestration (MLO) cluster.

8. The method of claim 1, wherein simultaneously sending the replicated data packet to the second AP over the second WCL through the second radio of the user device comprises simultaneously sending the replicated data packet to the second AP over the second WCL through the second radio of the user device in response to degradation of the first WCL.

9

9. A system comprising:

a memory storage; and a processing unit coupled to the memory storage, wherein the processing unit is operative to:

receive a data packet comprising a Differentiated Service Code Point (DSCP) field in a header;

determine that the data packet comprises a candidate traffic for bi-casting;

set, in response to determining that the data packet comprises the candidate traffic for bi-casting, a flag in the DSCP field in the header of the data packet, wherein the flag triggers replication of the data packet and simultaneous bi-casting of the data packet and replicated data packet on two different and independent wireless communication links; and send the data packet to a destination device, wherein the processing unit being operative to send the data packet to the destination device comprises the processing unit being operative to:

replicate, at a network interface of a user device, the data packet;

send the data packet to a first Access Point (AP) over a first Wireless Channel Link (WCL) through a first radio of the user device, wherein the first radio establishes the first WCL with the first AP, and simultaneously send the replicated data packet to a second AP over a second WCL through a second radio of the user device, wherein the second radio establishes the second WCL with the second AP.

10. The system of claim 9, wherein the processing unit being operative to set the flag comprises the processing unit being operative to change a Least Significant bit (LSB) in the DSCP field of the data packet from a first value to a second value.

11. The system of claim 10, wherein the processing unit being operative to change the LSB in the DSCP field from the first value to the second value comprises the processing unit being operative to change the LSB in the DSCP field from a bit value 0 to a bit value 1.

12. The system of claim 9, wherein the processing unit being operative to determine that the data packet comprises the candidate traffic for bi-casting comprises the processing unit being operative to determine that the data packet comprises a latency sensitive traffic.

13. The system of claim 9, wherein the first AP and the second AP form a Multi-Link Orchestration (MLO) cluster.

14. The system of claim 9, wherein the data packet is generated by a Virtual Reality/Augmented Reality application.

10

15. A method comprising:

receiving a data packet;

detecting a trigger for bi-casting the data packet, wherein detecting the trigger comprises determining that a Differentiated Service Code Point (DSCP) field in a header of the data packet comprises a flag that triggers replication of the data packet and simultaneous bi-casting of the data packet; and bi-casting the data packet in response to detecting the trigger, wherein bi-casting the data packet comprises:

replicating, at a network interface of a user device, the data packet, forwarding the data packet to a first Access Point (AP) over a first Wireless Channel Link (WCL) through a first radio of the user device, wherein the first radio establishes the first WCL with the first AP, and simultaneously forwarding the replicated data packet to a second AP over a second WCL through a second radio of the user device, wherein the second radio establishes the second WCL with the second AP.

16. The method of claim 15, further comprising:

receiving, by the first AP, the data packet;

removing, by the first AP, the flag from the DSCP field of the data packet; and forwarding, by the first AP, the data packet to a destination device.

17. The method of claim 15, further comprising:

receiving, by a destination device, the data packet and replicated data packet; and discarding, by the destination device, one of the data packet and the replicated data packet.

18. The method of claim 15, wherein detecting the trigger for bi-casting the data packet comprises determining that a Least Significant Bit (LSB) of the DSCP field comprises a bit value 1.

19. The method of claim 15, wherein forwarding the data packet to the first AP comprises:

establishing the first WCL with the first AP through a first radio; and forwarding the data packet over the first WCL.

20. The method of claim 15, wherein forwarding the replicated data packet to the second AP comprises:

establishing the second WCL with the second AP through a second radio; and forwarding the replicated data packet over the second WCL.

\* \* \* \* \*